April 21, 1959     J. JERGER, JR     2,883,295
GLASS COMPOSITION
Filed Feb. 24, 1958
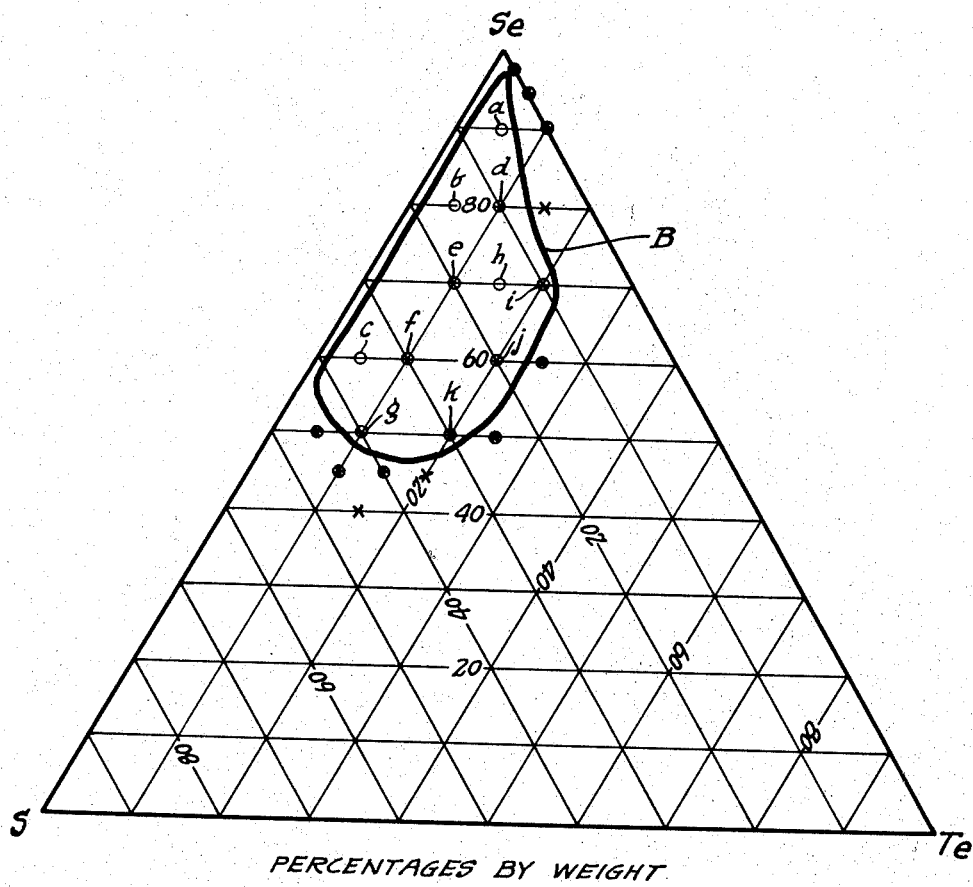
PERCENTAGES BY WEIGHT
INVENTOR
JOSEPH JERGER, JR

United States Patent Office 2,883,295
Patented Apr. 21, 1959

2,883,295

GLASS COMPOSITION

Joseph Jerger, Jr., Hempstead, N.Y., assignor to Servo Corporation of America, New Hyde Park, N.Y., a corporation of New York Application February 24, 1958, Serial No. 717,053

2 Claims. (Cl. 106—47)

The present invention relates to glasses produced from mixtures including the elements tellurium, sulfur and selenium and, in particular, to glasses having desirable properties in the infrared spectrum.

In the indicated glass field, arsenic trisulfide ($As_2S_3$) is known to produce a homogeneous glass. This glass has desirable properties in the infrared spectrum, but its transmission does not extend as far into the infrared as is often desirable. For example, arsenic trisulfide glass will selectively transmit infrared radiation up to a transmission cut-off wave length of about 12.5 microns. "Transmission cut-off" as used herein is defined as the wavelength at which the transmission through a 2 mm. thickness of the glass has decreased to 10% and past which the transmission does not again rise above 10%. Arsenic triselenide ($As_2Se_3$) and mixtures of this compound with arsenic trisulfide ($As_2S_3$) are similarly limited.

Insofar as this application is concerned, infrared rays are divided into two wavelength categories: (1) near infrared, which includes wavelengths ranging from the end of the visible spectrum, i. e. about 0.7 micron, up to about 2.5 microns, and (2) far infrared, which ranges from about 2.5 up to about 25 microns.

In infrared devices such as infrared spectrometers, gas analyzers, radiation pyrometers, bolometers and similar instruments, it is important that the glass employed in the optics be selective to infrared radiation. It is desirable that the infrared device operate selectively and flexibly over as wide a wavelength range as possible, e.g. 2.5 to 16 microns. In applications involving a transmission of infrared energy from a source of radiation through the atmosphere to an infrared detector, transmission in the spectral range of about 8 to 13 microns is very desirable.

It is, accordingly, an object of the invention to provide a new field of glass compositions of the character described.

It is another object to provide improved infrared-transmitting glasses.

A further object is to provide new glasses meeting the above objects and yet substantially opaque to visible light.

Other objects and various further features of novelty and invention will be pointed out or will occur to those skilled in the art from a reading of the following specification in conjunction with the accompanying triaxial diagram, said diagram depicting a field of glasses in which the substantial components are the elemental materials tellurium, sulfur and selenium.

Briefly stated, I have found a new field of glasses comprising the fused-reaction products of various mixtures of the elements tellurium, selenium and sulfur characterized by improved transmission properties.

In the accompanying triaxial diagram the left-hand vertex represents 100 percent sulfur (S), the right-hand vertex represents 100 percent tellurium (Te), and the upper vertex represents 100 percent selenium (Se). Any point in the diagram represents a definite composition in weight percent; for example, point $e$ represents a composition containing 10 percent tellurium, 20 percent sulfur, and 70 percent selenium.

The continuous solid line B in the diagram is empirically developed and encloses an area in which glasses are definitely formed, as compared to the region outside this area in which the compositions are substantially crystalline. In determining compositions in accordance with the triaxial diagram, the selenium content should preferably not exceed 97% and at least about 2% tellurium should be present to assure improved transmission. I have plotted certain specific compositions which have been made. Inside the area defined by line B, these points all represent glasses and are each identified by a small circle (○). Good glasses of improved infrared transmission properties will form from compositions anywhere in this area. Points substantially outside the area are designated by a cross (×) and represent purely crystalline compositions, and other points near but outside solid line B are designated by a cross in a circle (⊗) and represent generally glassy materials with some crystalline content.

The diagram thus shows that as the selenium content decreases and tellurium increases, a rather broad range of glass compositions is obtainable. By adding at least about 2% by weight of tellurium to a composition of selenium and sulfur, and preferably at least about 5%, optical glasses of improved transmission properties are assured. Thus, it will be apparent from the area enclosed by line B of the triaxial diagram taken together with the foregoing disclosure that the tellurium content will range by weight from about 2 to 24%, the sulfur content from about 1 to 43%, and the selenium content from about 47 to 97%. A preferred range included by the area defined by line B is one comprising 2 to 20% tellurium, 7.5 to 40% sulfur, and the balance substantially selenium from about 52.5 to 85%. Examples of good glasses indicated by the area are as follows:

| Composition | Percent Te | Percent S | Percent Se |
|---|---|---|---|
| a | 5 | 5 | 90 |
| b | 5 | 15 | 80 |
| c | 5 | 35 | 60 |
| d | 10 | 10 | 80 |
| e | 10 | 20 | 70 |
| f | 10 | 30 | 60 |
| g | 10 | 40 | 50 |
| h | 15 | 15 | 70 |
| i | 20 | 10 | 70 |
| j | 20 | 20 | 60 |
| k | 20 | 30 | 50 |

In producing the glass composition provided by the invention the following procedure is employed:

A glass composition corresponding to about 10% Te, 20% S and 70% Se (designated as composition $e$ in the table above) is prepared by weighing out a total of 500 grams of the elements of substantially high purity in the comminuted or granulated form. The elements are proportioned in accordance with the composition desired and are mixed and placed in a "Pyrex" glass container (about 2 inches in diameter) provided with a "Pyrex" glass cover adapted to enable a stirring rod to pass through the cover into the container and to enable the provision of an inert atmosphere of nitrogen, argon, etc.

The container is placed in a resistance-wound vertical furnace and heated so that the temperature is raised to 250° C. as fast as possible and held there so as to melt the sulfur and selenium. At this point, the mass is stirred in order to maintain a uniform mixture between the liquid phase and the solid tellurium and to facilitate a smooth reaction. Upon completion of stirring, the mass is further heated at a maximum rate to 500° C. and the mixture which is completely molten stirred again, the stirring being continued for about an hour at this temperature.

The molten bath is then cooled down to about 400° C. at a rate of about 8 to 10° C. per hour while stirring at a continually decreasing rate to prevent striae, and the stirrer is then removed. The melt is then cooled to 275° C. over a twenty-four hour period, this rate of cooling being important to prevent striae. At the end of this period, the composition is cooled from 275° C. to 190° C. in four hours.

After the temperature has reached 190° C., the composition is subjected to an annealing step comprising cooling it slowly to 150° C. over a twenty-four hour period. The power of the furnace is turned off and the composition finally furnace-cooled to room temperature.

The glass product obtained from the "Pyrex" glass container is about 4 inches long and 2 inches in diameter. In subjecting the glass to a transmission test, a disc of about one quarter inch thick is first obtained from near the center of the cylindrical product by cutting with a diamond wheel. The slice is ground to a thickness of 2 mm., and polished in an essentially conventional manner.

The resulting test sample is then mounted in a sample holder and put into the sample beam of a Baird double-beam recording infrared spectrophotometer (manufactured by the Baird Atomic Co. of Cambridge, Mass.). The instrument is operated to record the transmission characteristics of infrared radiation ranging from 2 to 16 microns in wavelength. The results showed that this glass (10% Te, 20% S and 70% Se) indicated an improved cut-off at a wavelength of about 13 microns.

A glass composition comprising 5% Te, 15% S and 80% Se (composition $b$) indicated a cut-off at a wavelength of about 12.5 microns. Another glass composition comprising 15% Te, 15% S and 70% Se (composition $h$) exhibited a cut-off of about 13.5 microns. Still another composition comprising 20% Te, 10% S and 70% Se (composition $i$) exhibited a rather high cut-off of about 13.6 microns.

It will be apparent from the foregoing examples that tellurium combined with sulfur and selenium results in improved transmission properties. Such properties are obtained by producing glasses within the area delineated by continuous solid line B, particularly when produced over the composition range comprising about 2 to 20% Te, 7.5 to 40% S, and 52.5 to 85% Se.

While the invention is concerned substantially with the ternary compositions disclosed and claimed herein, it will be appreciated that small amounts of other ingredients may be tolerated in the ternary composition without adversely affecting substantially the transmission properties of the glass provided by the invention.

It will be seen that I have described improved glass compositions and have delineated a new field of glasses. My glasses have good infrared-transmitting properties and provide certain security in the visual range by virtue of their substantial opacity to visible light.

While I have described the invention in detail with particular reference to certain glasses, it will be understood that the invention is of broader scope and is defined in the claims which follow.

What is claimed is:

1. An optical, infrared-transmitting glass composition consisting essentially of a fused, vitreous, non-crystalline mixture of tellurium, sulfur and selenium in amounts determined in the accompanying triaxial diagram by the area defined by continuous solid line B.

2. An optical, infrared-transmitting glass composition consisting essentially of a fused, vitreous, non-crystalline mixture of tellurium, sulfur and selenium with tellurium ranging from about 2 to 20%, sulfur from about 7.5 to 40% and the balance substantially 52.5 to 85% of selenium.

References Cited in the file of this patent

The Glass Industry, September 1935, page 285.
Pelabon: Ann. Chem. Phys. Chem. Abst., 17, 526–66, 1910.